May 1, 1928.
C. F. SHERWOOD ET AL
1,667,992
CENTRIFUGAL PUMP
Filed Aug. 4, 1924
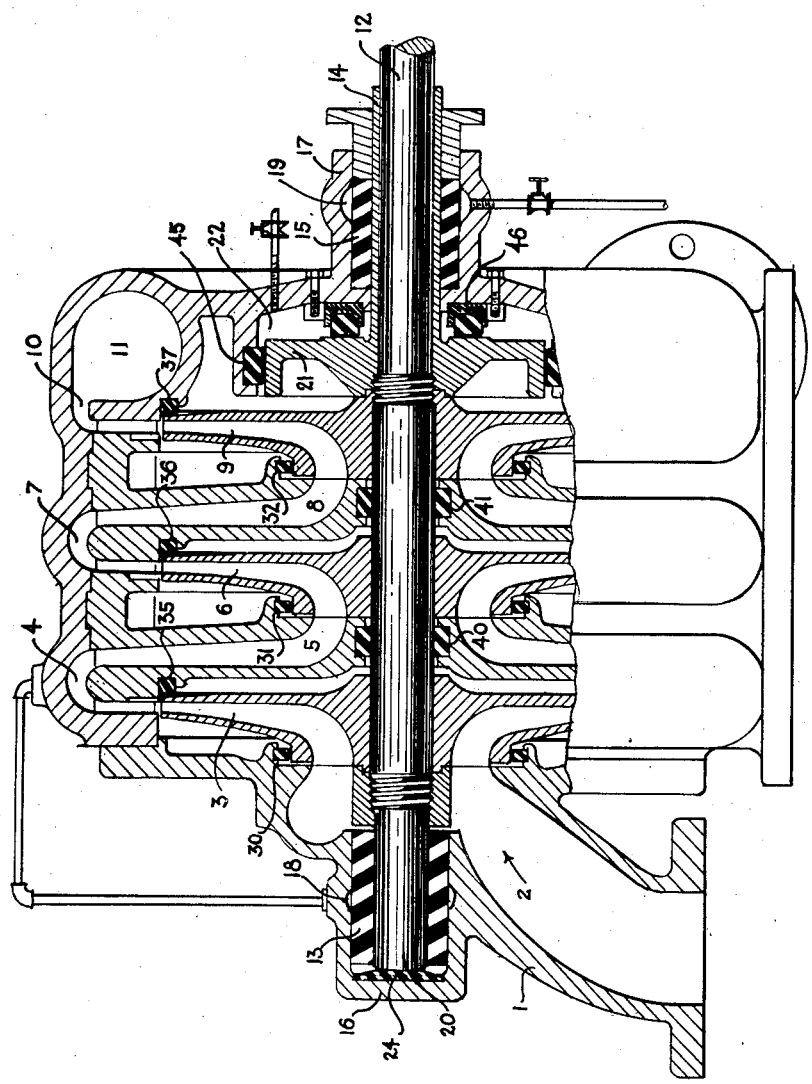
INVENTOR.
Charles Frederick Sherwood &
Edwin Letts Oliver
BY
A W Boyken
their ATTORNEY.

Patented May 1, 1928.

1,667,992

UNITED STATES PATENT OFFICE.

CHARLES FREDERIC SHERWOOD, OF NEW YORK, N. Y., AND EDWIN LETTS OLIVER, OF PIEDMONT, CALIFORNIA, ASSIGNORS TO OLIVER-SHERWOOD CO., A CORPORATION OF CALIFORNIA.

CENTRIFUGAL PUMP.

Application filed August 4, 1924. Serial No. 729,893.

Our invention is particularly applicable to axially mounted elements adapted to rotate in proximity to fixed elements and wherein it is advantageous to maintain a close running fit between the two, as for example the rotors of centrifugal turbines or pumps where a plurality of compartments at different pressures are separated by the joints between the rotating and stationary elements.

By our invention it is possible to greatly reduce the length of the present single or multi-stage pumps, with the result that the length of the shaft is correspondingly reduced. It is also possible to materially reduce the manufacturing costs of such pumps. Outboard bearings may be dispensed with altogether. Our invention effects a seal between the several compartments of a multi-stage pump and at the same time attains a most perfect rotative action in the bearings and running joints.

This seal between compartments of differential pressure is accomplished by our elastic or resilient rings whereas a flexibility of the axis of gyration is at the same time attained by employing rubber or the like in our resilient bearings.

The gist of our invention is the combination of the resilient sealing means and resilient bearing means.

These objects we accomplish by suspending the shaft of the rotating elements within a rubber or the like sleeve, positioned between the stationary element and the journal. We also introduce rubber or the like resilient rings at all of the running joints as between the compartments or zones of varying pressures. In this way the shaft rotates about a true axis of gyration within a resilient sleeve or bearing and all of the elements carried by the shaft, rotate in close proximity or contact with resilient sealing rings. The insertion of rubber or other resilient sealing rings which permit a compensation for the eccentricities of the rotating parts in resilient bearings, while maintaining a perfect inter-compartment seal. Thus all metallic contact between the shaft and its rotating elements, and the stationary casing and its accessory parts is eliminated.

The use of rubber also in the bearings results in an equalization of support over the entire surface due to the flexibility of rubber. Other advantages of the use of rubber are its comparative freedom from friction when a liquid lubricant film is maintained as between the bearing surface and the shaft journals and sealing rings between the stationary and rotating elements, with a resulting minimum of wear and replacement. By using a series of rubber bearings, as for instance in a multi-stage centrifugal pump, the compressibility of the rubber or other resilient bearing material, permits slight displacement of the rotating element from the true axis of symmetry while allowing such shaft to rotate about the axis of gyration. This slight displacement of the rotating element allows the rotors carried by such shaft to operate with a perfect sealing result as between compartments of varying pressure by a differential compression of the respective rubber surfaces.

By referring to the accompanying drawing which represents a conventional three stage centrifugal pump, partly in cross section, to which our invention has been applied, the operation will be made clear.

The numeral 1 indicates the suction elbow of a three stage centrifugal pump through which water may enter in the direction of the arrow 2. From this inlet it is taken up by the runner 3 and through the centrifugal action is caused to flow through the channels 4, 5, to the inlet of the runner 6. This runner 6, by its action further increases the pressure in the channel 7 from which water flows through 8 and is delivered to the runner 9, which latter discharges the further increased pressure water through the channel 10 into the discharge outlet 11. The rotors 3, 6, and 9 are mounted to rotate with the shaft 12 which latter is carried in the rubber bearing 13, on one end, and which shaft has the sleeve 14 rigidly fixed thereon at the other end. This sleeve rotates in the rubber bearing 15 on the opposite end.

It is to be understood that the shaft 12 is connected with any conventional driving means as a pulley or motor whereby the pump is driven. The rubber bearings 13 and 15 are carried in the casing projections 16 and 17 respectively and are water lubricated in the well known way through the channels 18 and 19 whereby a water or other suitable liquid film is maintained between the journal 20 and rubber bearing 13, and between the sleeve 14 and rubber bearing 15.

At 21 is a disk or plate forming a closure through rubber rings 45 and 46 for the chamber 22 to effect a fluid counter balance of the thrust occasioned by the differential water pressure and exposed surfaces. The balancing disk 21, may however, be dispensed with and a rubber thrust 24 for instance, placed in the casing projection 16, in order to take up the end thrust that might be occasioned, or both the disk 21 and end thrust 24 may be used.

At 30, 31 and 32 are rubber sealing rings to prevent leakage from the relatively high pressure sides of the runners 3, 6, 9 respectively to the low pressure or inlet sides thereof, and at 35, 36 and 37 are other rubber or resilient rings for the purpose of preventing a water circulation and consequently a cutting of the material of the casing and runners due to high velocity liquid between the high pressure or discharge side of each of the runners and the inlet side of the next adjacent runner.

Where the shaft is comparatively long and the strains due to the weight and operation of the rotating elements is severe as in a multi-stage pump, it is advisable to support the shaft at intermediate points between the bearings 13, 15 and for this purpose we introduce the rings 40, 41 between the casing and the rotor which rings are completely lubricated at all times because of their emersion in liquid under pressure and the consequent liquid film maintained therebetween.

These rings also allow slight shaft displacements, due to the use of rubber or other resilient material, by at all times, effecting a perfect seal while allowing surface displacement at suitable places where such rings are inserted. The resilient rings effect a continuous seal between the runners and the stationary elements, while the shaft makes its own rotative alignment, whereas the former metallic rings were unsuitable for effecting such a seal. When the rotor is at rest and there is no pressure within the pump a seal is effected by our resilient rings which contact opposing surfaces at all times. In this way our sealing rings differ from the ordinary packing which requires initial compression in order to effect a seal.

When the shaft 12 is rotating, its peripherical surfaces diverge slightly out of the true plane about its symmetrical axis. In this case the rubber bearings and sleeves 13, 15, 40 and 41 give way on one side and expand appropriately on the opposite side. Likewise the rubber rings 30, 31, 32, 35, 36 and 37, adjust themselves to effect a closure or seal, such adjustment varying in accordance with the shaft displacement and being effected by the pressure within the casing. We have found that the fluid itself, handled by the pump, provides ideal lubrication for the resilient surfaces of the supporting thrust bearings and the sealing rings, and thus the difficulty of maintaining proper oil lubrication is entirely obviated.

When the disk 21 is operating in conjunction with the pressure chamber 22, the running joints between the two may be supplied with additional rubber rings 45 and 46.

Reference is made to a copending application of Edwin Letts Oliver, Serial No. 484,093.

While we have shown our invention as applied to a multi-stage centrifugal pump it will be obvious that other uses will suggest themselves to one skilled in the art. We desire to be understood as including all such variations which do not depart from the spirit and scope of our invention.

We claim:

1. A multi-stage centrifugal pump comprising in combination a casing, shaft, spaced impellers mounted on the shaft, a pair of soft rubber main bearings rotatably supporting the shaft in the casing at extreme ends of the pump and a relatively narrow soft rubber ring bearing rotatably supporting the shaft at an intermediate point on said casing.

2. A multi-stage centrifugal pump comprising in combination a casing, shaft, spaced impellers mounted on the shaft, a pair of soft rubber main bearings rotatably supporting the shaft in the casing at extreme ends of the pump and a relatively narrow soft rubber ring bearing rotatably supporting the shaft on the casing between each stage of the pump.

3. A centrifugal pump comprising in combination a casing, shaft, impeller mounted on the shaft, and a pair of main bearings rotatably supporting the shaft in the casing at extreme ends of the pump, said shaft projecting beyond one of said bearings for the reception of power, and the other bearing entirely enclosing and sealing the end of the shaft to the casing and open to its liquid compartment.

4. A centrifugal pump comprising in combination a casing, shaft, impeller mounted on the shaft, and a pair of main bearings rotatably supporting the shaft in the casing at extreme ends of the pump, said shaft projecting beyond one of said bearings for the reception of power, and the other bearing entirely enclosing and sealing the end of the shaft to the casing and a soft rubber thrust member interposed between the last mentioned end of the shaft and its bearing.

5. A centrifugal pump comprising a casing, shaft, impeller mounted on the shaft, a pair of main bearings rotatably supporting the shaft in the casing at the extreme ends of the pump, said shaft projecting beyond one of said bearings for the application of power and the other bearing entirely enclosing the other end of the shaft in communication with the adjacent liquid passage of the pump, and a soft rubber thrust member interposed between the extreme end of the shaft and the bearing, arranged to receive lubricating liquid from said pump for discharge into the said passage.

6. A multi-stage centrifugal pump comprising casing, shaft rotatably supported within the casing in soft rubber bearings, resilient sealing means on the shaft between each stage of the pump, a soft rubber ring radially gripped between each impeller and the casing outside of but adjacent the intake of each impeller, and a soft rubber ring between each stage of the pump bearing laterally against each impeller adjacent the periphery thereof.

7. A centrifugal pump comprising a casing, a shaft rotatably supported therein, an impeller, and a balancing disk secured thereto, a soft rubber ring in rotative contact with the periphery of the disk and a soft rubber ring in rotative contact with the side of the disk adjacent the hub, both rings sealing the disk to the casing and forming a fluid pressure space therebetween.

CHARLES FREDERIC SHERWOOD.
EDWIN LETTS OLIVER.